(12) United States Patent
Miao et al.

(10) Patent No.: US 11,772,561 B1
(45) Date of Patent: Oct. 3, 2023

(54) DIGITAL FLASHLIGHT TO HELP HITCHING AND OTHER MANEUVERS IN DIM ENVIRONMENT

(71) Applicant: GM GLOBAL TECHNOLOGY OPERATIONS LLC, Detroit, MI (US)

(72) Inventors: Yun Qian Miao, Waterloo (CA); Charles A Massoll, Commerce Township, MI (US); Ephraim Chi Man Yuen, Markham (CA)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 17/658,318

(22) Filed: Apr. 7, 2022

(51) Int. Cl.
*B60R 1/26* (2022.01)
*G09G 3/20* (2006.01)
*G09G 5/10* (2006.01)

(52) U.S. Cl.
CPC .............. *B60R 1/26* (2022.01); *G09G 3/2007* (2013.01); *G09G 5/10* (2013.01); *G09G 2320/0686* (2013.01); *G09G 2360/16* (2013.01); *G09G 2380/10* (2013.01)

(58) Field of Classification Search
None
See application file for complete search history.

(56) References Cited

U.S. PATENT DOCUMENTS

| | | | | |
|---|---|---|---|---|
| 7,609,908 B2* | 10/2009 | Luo | ...................... | H04N 1/6027 348/222.1 |
| 7,737,958 B2* | 6/2010 | Jeon | ..................... | G06F 3/04886 345/169 |
| 9,536,290 B2* | 1/2017 | Johnson | ................. | H04N 23/60 |
| 2012/0219218 A1* | 8/2012 | Demandolx | ............ | G06T 5/007 382/168 |
| 2014/0343790 A1* | 11/2014 | Hestermeyer | ............ | B62D 6/04 701/41 |
| 2015/0363651 A1* | 12/2015 | Zhao | ...................... | G06V 20/56 382/104 |
| 2019/0193633 A1* | 6/2019 | Ichikawa | ................. | H04N 7/18 |

* cited by examiner

*Primary Examiner* — Matthew Yeung
(74) *Attorney, Agent, or Firm* — Lorenz & Kopf LLP (57) ABSTRACT

In exemplary embodiments, methods and systems are provided for a digital flashlight for a vehicle. In another exemplary embodiment, a system is provided that includes a display of a vehicle; and a processor coupled to the display of the vehicle and a camera of the vehicle and configured to at least facilitate: obtaining a camera image frame via the camera of the vehicle; determining a first region of the camera image frame having a first brightness level; determining a second region of the camera image frame having a second brightness level that is greater than the first brightness level; and providing instructions to the display of the vehicle for displaying the first region with increased brightness that is based on the second brightness level.

19 Claims, 4 Drawing Sheets

DIGITAL FLASHLIGHT TO HELP HITCHING AND OTHER MANEUVERS IN DIM ENVIRONMENT

INTRODUCTION

The technical field generally relates to vehicles and, more specifically, to methods and systems for providing enhancement of digital images from a vehicle camera in a dim environment.

Certain vehicles today include camera functionality in which the camera images are provided for a user of the vehicle. However, in certain circumstances, the camera images may include a region of interest that has relatively low brightness in comparison to other regions of the camera images. This may occur, for example, during a hitching process, during parking, or in various other maneuvers for the vehicle.

Accordingly, it is desirable to provide improved methods and systems for improving visibility of camera images for users of a vehicle or of a remote device used in connection with the vehicle, including when a region of interest may have reduced brightness. Furthermore, other desirable features and characteristics of the present disclosure will become apparent from the subsequent detailed description and the appended claims, taken in conjunction with the accompanying drawings and the foregoing technical field and background.

SUMMARY

In an exemplary embodiment, a method is provided that includes obtaining a camera image frame via a camera of a vehicle; determining via a processor, a first region of the camera image frame having a first brightness level; determining, via the processor, a second region of the camera image frame having a second brightness level that is greater than the first brightness level; and displaying, via instructions provided by the processor, the first region with increased brightness that is based on the second brightness level.

Also in an exemplary embodiment, the step of determining the second region includes determining, via the processor, the second region based on a common texture shared by both the first region and the second region.

Also in an exemplary embodiment, the method further includes calculating a brightness ratio between the first brightness level and the second brightness level; wherein the step of displaying the first region with increased brightness includes displaying the first region with the increased brightness that is based on the brightness ratio.

Also in an exemplary embodiment, the step of displaying the first region with increased brightness includes displaying the first region with the increased brightness that is equal to the second brightness level, such that the brightness ratio is equal to one.

Also in an exemplary embodiment, the step of displaying the first region with increased brightness includes displaying the first region with the increased brightness without adjusting a color chromaticity of the first region.

Also in an exemplary embodiment, the first region corresponds to a region of interest as selected via a user of the vehicle.

Also in an exemplary embodiment, the first region is determined, via the processor, based at least in part on vehicle dynamics of the vehicle.

Also in an exemplary embodiment, the first region is determined, via the processor, based at least in part on a steering angle of the vehicle.

Also in an exemplary embodiment, the first region is determined, via the processor, based at least in part on a detected object in proximity to the vehicle.

In another exemplary embodiment, a system is provided that includes a display of a vehicle; and a processor coupled to the display of the vehicle and a camera of the vehicle and configured to at least facilitate: obtaining a camera image frame via the camera of the vehicle; determining a first region of the camera image frame having a first brightness level; determining a second region of the camera image frame having a second brightness level that is greater than the first brightness level; and providing instructions to the display of the vehicle for displaying the first region with increased brightness that is based on the second brightness level.

Also in an exemplary embodiment, the processor is further configured to at least facilitate determining the second region based on a common texture shared by both the first region and the second region.

Also in an exemplary embodiment, the processor is further configured to at least facilitate calculating a brightness ratio between the first brightness level and the second brightness level; and providing instructions to the display of the vehicle for displaying the first region with the increased brightness that is based on the brightness ratio, such that the brightness ratio is equal to one.

Also in an exemplary embodiment, the processor is further configured to at least facilitate providing instructions to the display of the vehicle for displaying the first region with the increased brightness without adjusting a color chromaticity of the first region.

Also in an exemplary embodiment, the first region corresponds to a region of interest as selected via a user of the vehicle.

Also in an exemplary embodiment, the processor is configured to at least facilitate determining the first region based at least in part on vehicle dynamics of the vehicle.

Also in an exemplary embodiment, the processor is configured to at least facilitate determining the first region based at least in part on a steering angle of the vehicle.

Also in an exemplary embodiment, the processor is configured to at least facilitate determining the first region based at least in part on a detected object in proximity to the vehicle.

In another exemplary embodiment, a vehicle is provided that includes a camera, a body, a display, and a processor. The camera is configured to generate camera data including a camera image frame of an environment pertaining to the vehicle. The body defines a cabin of the vehicle. The display of the vehicle is disposed inside the cabin. The processor is coupled to the display of the vehicle and the camera of the vehicle, and is configured to at least facilitate: determining a first region of the camera image frame having a first brightness level; determining a second region of the camera image frame having a second brightness level that is greater than the first brightness level; and providing instructions to the display of the vehicle for displaying the first region with increased brightness that is based on the second brightness level.

Also in an exemplary embodiment, the processor is further configured to at least facilitate providing instructions to the display of the vehicle for displaying the first region with the increased brightness without adjusting a color chromaticity of the first region.

Also in an exemplary embodiment, the camera includes a rear camera configured to generate the camera image frame for the environment in back of the vehicle.

DESCRIPTION OF THE DRAWINGS

The present disclosure will hereinafter be described in conjunction with the following drawing figures, wherein like numerals denote like elements, and wherein.

DETAILED DESCRIPTION

The following detailed description is merely exemplary in nature and is not intended to limit the disclosure or the application and uses thereof. Furthermore, there is no intention to be bound by any theory presented in the preceding background or the following detailed description.

Figure 1:
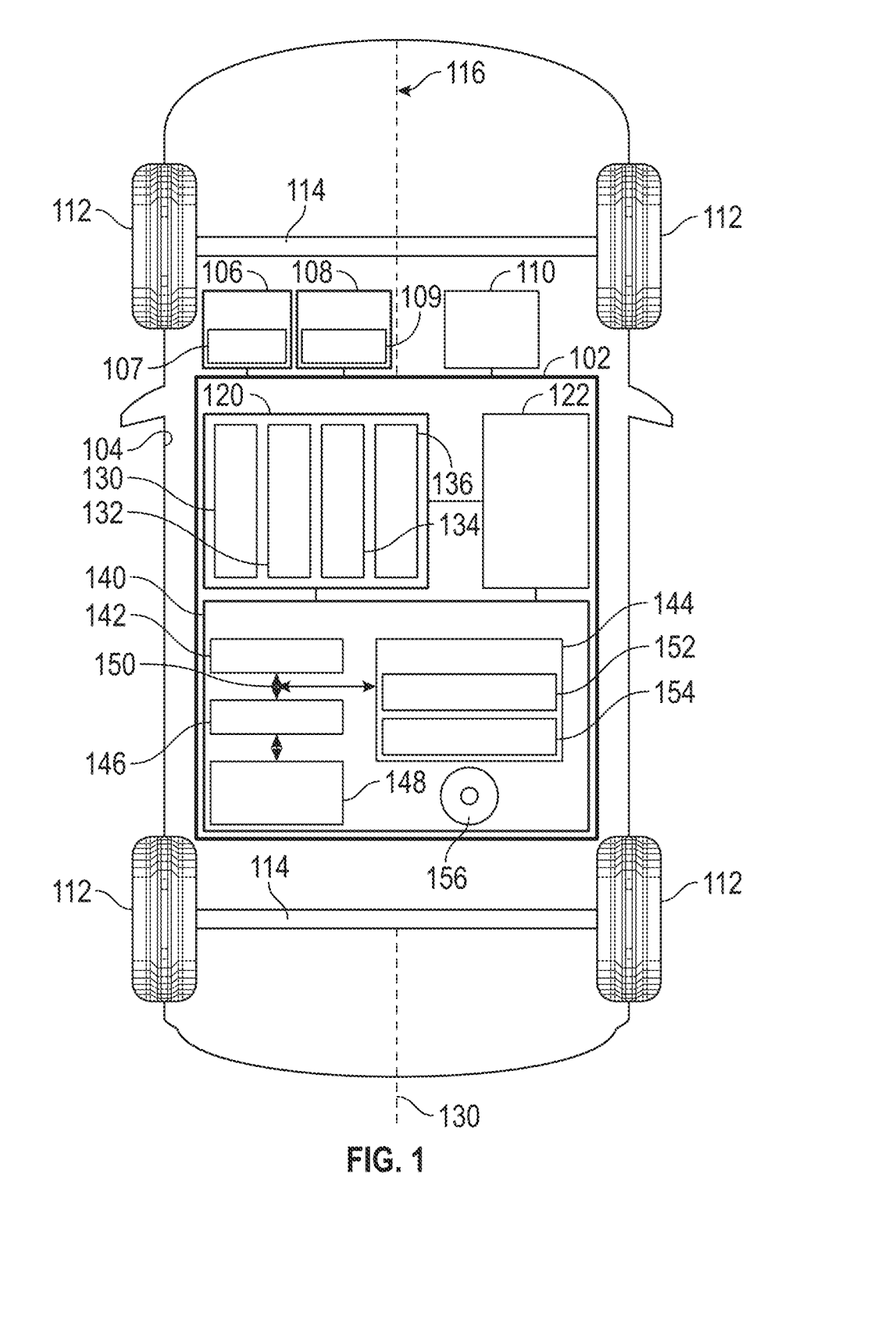
FIG. 1 is a functional block diagram of a vehicle that includes a control system for controlling digital images, and processing and display thereof for users of the vehicle, and that provides enhanced brightness for a region of interest in the digital images when an existing brightness of the region of interest is less than a predetermined threshold and/or a brightness present in one or more other regions of the digital images, in accordance with exemplary embodiments.

FIG. 1 illustrates a vehicle 100, according to an exemplary embodiment. As described in greater detail further below, the vehicle 100 includes a control system 102 that is configured for controlling digital images, and processing and display thereof for users of the vehicle, and that provides enhanced brightness for a region of interest in the digital images in the form of a digital "flashlight" when an existing brightness of the region of interest is less than a predetermined threshold and/or a brightness present in one or more other regions of the digital images, in accordance with exemplary embodiments.

In various embodiments, the vehicle 100 includes an automobile. The vehicle 100 may be any one of a number of different types of automobiles, such as, for example, a sedan, a wagon, a truck, or a sport utility vehicle (SUV), and may be two-wheel drive (2WD) (i.e., rear-wheel drive or front-wheel drive), four-wheel drive (4WD) or all-wheel drive (AWD), and/or various other types of vehicles in certain embodiments. In certain embodiments, the vehicle 100 may also comprise a motorcycle or other vehicle, such as aircraft, spacecraft, watercraft, and so on, and/or one or more other types of mobile platforms (e.g., a robot and/or other mobile platform).

The vehicle 100 includes a body 104 that is arranged on a chassis 116. The body 104 substantially encloses other components of the vehicle 100. The body 104 and the chassis 116 may jointly form a frame. The vehicle 100 also includes a plurality of wheels 112. The wheels 112 are each rotationally coupled to the chassis 116 near a respective corner of the body 104 to facilitate movement of the vehicle 100. In one embodiment, the vehicle 100 includes four wheels 112, although this may vary in other embodiments (for example for trucks and certain other vehicles).

A drive system 110 is mounted on the chassis 116, and drives the wheels 112, for example via axles 114. In certain embodiments, the drive system 110 comprises a propulsion system. In certain exemplary embodiments, the drive system 110 comprises an internal combustion engine and/or an electric motor/generator, coupled with a transmission thereof. In certain embodiments, the drive system 110 may vary, and/or two or more drive systems 110 may be used. By way of example, the vehicle 100 may also incorporate any one of, or combination of, a number of different types of propulsion systems, such as, for example, a gasoline or diesel fueled combustion engine, a "flex fuel vehicle" (FFV) engine (i.e., using a mixture of gasoline and alcohol), a gaseous compound (e.g., hydrogen and/or natural gas) fueled engine, a combustion/electric motor hybrid engine, and an electric motor.

As depicted in FIG. 1, the vehicle also includes a braking system 106 and a steering system 108 in various embodiments. In exemplary embodiments, the braking system 106 controls braking of the vehicle 100 using braking components that are controlled via inputs provided by a driver, such as a brake pedal 107 as depicted in FIG. 1, and in certain embodiments, also via automatic control via the control system 102. Also in exemplary embodiments, the steering system 108 controls steering of the vehicle 100 via steering components, such as a steering wheel 108 as depicted in FIG. 1 (e.g., in connection with a steering column coupled to the axles 114 and/or the wheels 112) that are controlled via inputs provided by a driver (e.g., via the steering wheel) 108), and in certain embodiments also via automatic control via the control system 102.

In the embodiment depicted in FIG. 1, the control system 102 is coupled to the steering system 108. In certain embodiments, the control system 102 may also be coupled to the braking system 106, the drive system 110, and/or one or more other vehicle systems and/or components. Also as depicted in FIG. 1, in various embodiments, the control system 102 includes a sensor array 120, a display 122, and a controller 140.

In various embodiments, the sensor array 120 includes various sensors that obtain sensor data for use by the controller 140 in controlling digital images for the vehicle 100, as well as for use in other vehicle functionality. In the depicted embodiment, the sensor array 120 includes one or more cameras 130, detection sensors 132, steering sensors 134, and user interface sensors 136. It will be appreciated that in certain embodiments the sensor array 120 may also include any number of additional sensors such as, by way of example only, one or more brake pedal sensors, wheel speed sensors, accelerometers, and so on. It will be appreciated that while a sensor array 120 is described, in various embodiments this may be different, for example in that certain features described in connection with the sensor array 120 may be performed by the camera 130 and/or controller 140 (e.g., the breakdown and processing of the video).

In various embodiments, the one or more cameras 130 collect digital images in proximity to the vehicle 100. As depicted in FIG. 1, in various embodiments one or more cameras 130 are disposed at or near a rear end of the vehicle 100, and provide digital images of environment to the rear of the vehicle 100. In certain other embodiments, one or more cameras 130 may similarly be located at one or more other exterior locations (e.g., at or near the front, sides, roof, underbody, and so on of the vehicle 100) and/or may be located at one or more interior locations (e.g., inside a cabin of the vehicle 100). In certain embodiments, the one or more cameras 130 provide still digital images of an environment pertaining to the vehicle 100. In certain other embodiments, the one or more cameras 130 provide moving digital images of an environment pertaining to the vehicle 100.

Also in various embodiments, the detection sensors 132 detect one or more other vehicles and/or other types of objects in proximity to the vehicle 100. In certain embodiments, the detection sensors 132 include one or more lidar, radar, sonar, microphone, and/or other detection sensors of the vehicle 100. In certain embodiments, the detection sensors 132 detect individuals and/or objects, including movement thereof and/or sounds emitted therefrom, outside the vehicle 100 and in proximity to the vehicle 100. In certain other embodiments, the detection sensors 132 detect individuals and/or objects, including movement thereof and/or sounds emitted therefrom, inside the vehicle 100 (e.g., inside a cabin thereof).

In various embodiments, the steering sensors 134 are configured to measure a driver's interaction with the steering system 108 of the vehicle 100, including an angle at which the steering wheel 109 is engaged. In various embodiments, the steering sensors 134 are part of and/or coupled to the steering wheel 109. It will be appreciated that in certain embodiments a steering wheel 109 may not be required (e.g., in the case of autonomous vehicles).

Also in various embodiments, the user interface sensors 136 detect user inputs with respect to the digital images. In certain embodiments, the user interface sensors 136 are part of or coupled to the display 122. Also in certain embodiments, the user interface sensors 136 detect a user's selection on the display 122 as to a region of interest for the digital images, for example including a region of interest of the digital images for which the user desires brightness enhancement. In certain embodiments, the user interface sensors 136 comprise capacitive or "touch" sensors; however, this may vary in other embodiments.

In various embodiments, the display 122 provides a visual depiction of digital images for one or more users of the vehicle 100. In certain embodiments, the display 122 includes a display screen that provides, for a driver and/or one or more other passengers inside a cabin of the vehicle, digital images from the cameras 130 of the vehicle 100 after processing via the controller 140, for example as described in greater detail further below in connection with the process 200 of FIG. 2 and the implementations of FIGS. 3-6. Also in various embodiments, the display 122 also provides an opportunity for the users to select a region of interest of the digital images for brightness enhancement, for example by selecting the region of interest on the screen via touchscreen and/or via one or more input devices (and as detected via the one or more user interface sensors 136 of the sensor array 120). In certain embodiments, the display 122 is part of the vehicle 100. In certain other embodiments, the display 122 may be part of and/or coupled to one or more other devices and/or systems (e.g., a mobile phone or other electronic device of a user).

In various embodiments, the controller 140 is coupled to the sensor array 120 and the display 122. In various embodiments, the controller 140 receives digital images and other sensor inputs from the sensor array 120, processes the digital images to provide brightness enhancement for a region of interest of the digital images in the form of a digital "flashlight" in appropriate circumstances based on the processing, and provides enhanced digital images based on the processing to the display 122, for viewing by the driver, passengers, and/or other users inside a cabin of the vehicle 100. In various embodiments, the controller 140 provides these functions in accordance with the process 200 and implementations thereof as depicted in FIGS. 2-6 and described further below in connection therewith. In certain embodiments, the controller 140 may also provide additional functionality for the vehicle 100, including for the steering system 108, the braking system 106, the drive system 110, and/or one or more other vehicle systems and/or components.

In various embodiments, the controller 140 comprises a computer system (also referred to herein as computer system 140), and includes a processor 142, a memory 144, an interface 146, a storage device 148, and a computer bus 150. In various embodiments, the controller (or computer system) 140 controls vehicle operation, including controlling digital camera images and the processing and display thereof, among other vehicle control functions.

In various embodiments, the controller 140 (and, in certain embodiments, the control system 102 itself) is disposed within the body 104 of the vehicle 100. In one embodiment, the control system 102 is mounted on the chassis 116. In certain embodiments, the controller 140 and/or control system 102 and/or one or more components thereof may be disposed outside the body 104, for example on a remote server, in the cloud, or other device where image processing is performed remotely.

It will be appreciated that the controller 140 may otherwise differ from the embodiment depicted in FIG. 1. For example, the controller 140 may be coupled to or may otherwise utilize one or more remote computer systems and/or other control systems, for example as part of one or more of the above-identified vehicle 100 devices and systems.

In the depicted embodiment, the computer system of the controller 140 includes a processor 142, a memory 144, an interface 146, a storage device 148, and a bus 150. The processor 142 performs the computation and control functions of the controller 140, and may comprise any type of processor or multiple processors, single integrated circuits such as a microprocessor, or any suitable number of integrated circuit devices and/or circuit boards working in cooperation to accomplish the functions of a processing unit. During operation, the processor 142 executes one or more programs 152 contained within the memory 144 and, as such, controls the general operation of the controller 140 and the computer system of the controller 140, generally in executing the processes described herein, such as the process 200 of FIG. 2 and implementations thereof of FIGS. 3-6 and described further below in connection therewith.

The memory 144 can be any type of suitable memory. For example, the memory 144 may include various types of dynamic random access memory (DRAM) such as SDRAM, the various types of static RAM (SRAM), and the various types of non-volatile memory (PROM, EPROM, and flash). In certain examples, the memory 144 is located on and/or co-located on the same computer chip as the processor 142. In the depicted embodiment, the memory 144 stores the above-referenced program 152 along with one or more stored values 154 (e.g., look-up tables, thresholds, and/or other values with respect to the control of the digital images, and so on).

The bus 150 serves to transmit programs, data, status and other information or signals between the various components of the computer system of the controller 140. The interface 146 allows communication to the computer system of the controller 140, for example from a system driver and/or another computer system, and can be implemented using any suitable method and apparatus. In one embodiment, the interface 146 obtains the various data from the sensor array 120, among other possible data sources. The interface 146 can include one or more network interfaces to communicate with other systems or components. The interface 146 may also include one or more network interfaces to communicate with individuals, and/or one or more storage interfaces to connect to storage apparatuses, such as the storage device 148.

The storage device 148 can be any suitable type of storage apparatus, including various different types of direct access storage and/or other memory devices. In one exemplary embodiment, the storage device 148 comprises a program product from which memory 144 can receive a program 152 that executes one or more embodiments of one or more processes of the present disclosure, such as the steps of the process 200 of FIG. 2 and the implementations of FIGS. 3-6 and described further below in connection therewith. In another exemplary embodiment, the program product may be directly stored in and/or otherwise accessed by the memory 144 and/or a disk (e.g., disk 156), such as that referenced below.

The bus 150 can be any suitable physical or logical means of connecting computer systems and components. This includes, but is not limited to, direct hard-wired connections, fiber optics, infrared and wireless bus technologies. During operation, the program 152 is stored in the memory 144 and executed by the processor 142.

It will be appreciated that while this exemplary embodiment is described in the context of a fully functioning computer system, those skilled in the art will recognize that the mechanisms of the present disclosure are capable of being distributed as a program product with one or more types of non-transitory computer-readable signal bearing media used to store the program and the instructions thereof and carry out the distribution thereof, such as a non-transitory computer readable medium bearing the program and containing computer instructions stored therein for causing a computer processor (such as the processor 142) to perform and execute the program. Such a program product may take a variety of forms, and the present disclosure applies equally regardless of the particular type of computer-readable signal bearing media used to carry out the distribution. Examples of signal bearing media include: recordable media such as floppy disks, hard drives, memory cards and optical disks, and transmission media such as digital and analog communication links. It will be appreciated that cloud-based storage and/or other techniques may also be utilized in certain embodiments. It will similarly be appreciated that the computer system of the controller 140 may also otherwise differ from the embodiment depicted in FIG. 1, for example in that the computer system of the controller 140 may be coupled to or may otherwise utilize one or more remote computer systems and/or other control systems.

Figure 2:
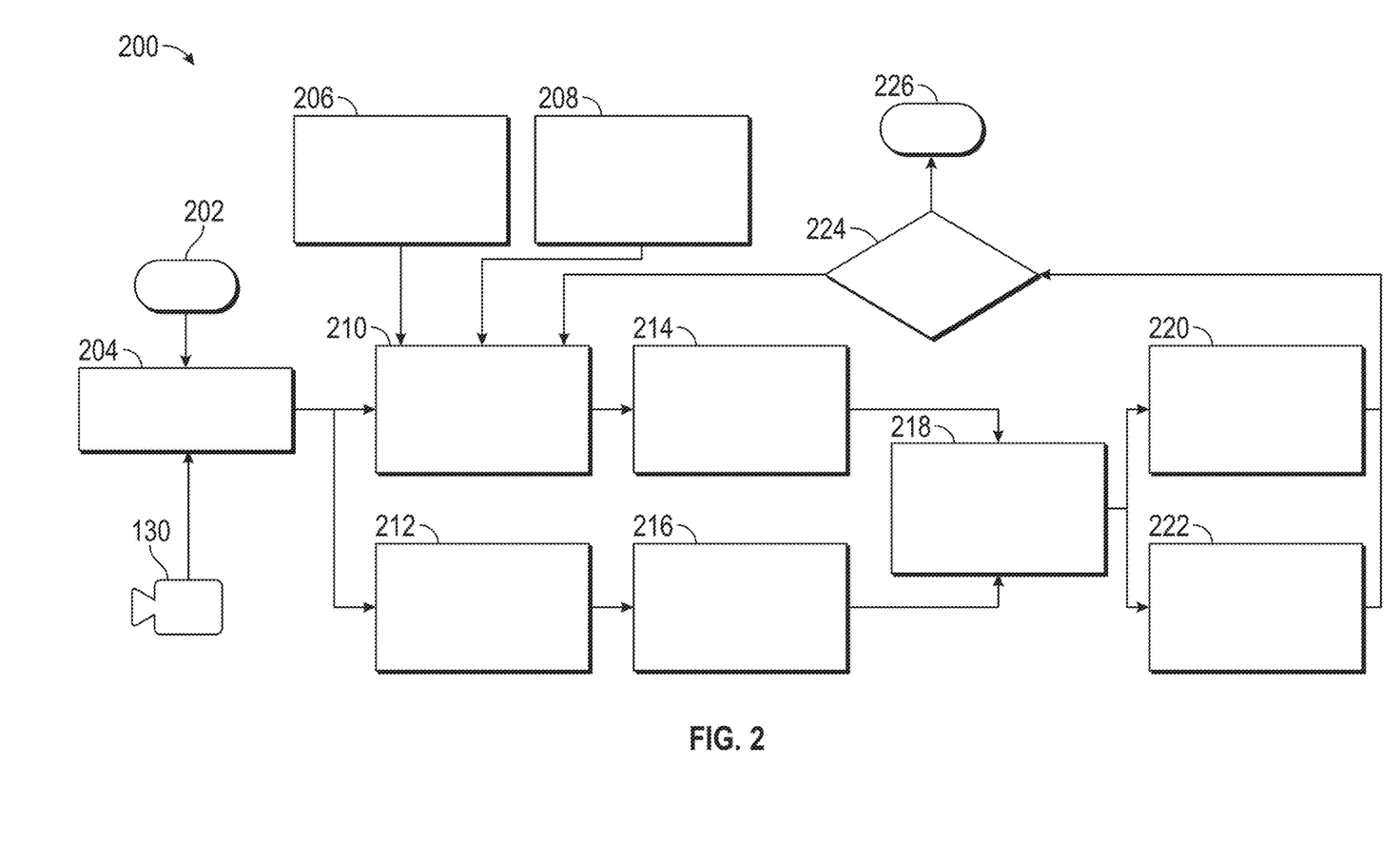
FIG. 2 is a flowchart of process for controlling digital images, and processing and display thereof for users of the vehicle, and that provides enhanced brightness for a region of interest in the digital images when an existing brightness of the region of interest is less than a predetermined threshold and/or a brightness present in one or more other regions of the digital images, and that can be utilized in connection with the vehicle and control, in accordance with exemplary embodiments.

FIG. 2 provides a flowchart of a process 200 for controlling digital images, and processing and display thereof for users of a vehicle, in accordance with exemplary embodiments. Also in exemplary embodiments, the process 200 provides enhanced brightness for a region of interest in the digital images in the form of a digital "flashlight" when an existing brightness of the region of interest is less than a predetermined threshold and/or a brightness present in one or more other regions of the digital images. The process will also be described further below in connection with FIGS. 3-6, which provide exemplary display images associated with respective implementations of the process 200 of FIG. 2 and the vehicle 100 of FIG. 1, in accordance with exemplary embodiments. In various embodiments, the process 200 may be implemented in connection with the vehicle 100 and control system 102 of FIG. 1, and components thereof.

As depicted in FIG. 2, the process 200 begins at step 202. In one embodiment, the process 200 begins when one or more cameras 130 of the vehicle 100 begin operation, and/or when the vehicle 100 begins operation in a manner that would utilize camera data. In certain embodiments (e.g., including a rear-facing camera), the process begins when the vehicle 100 is operated in a "reverse" transmission gear or mode. In certain other embodiments, the process 200 begins when the vehicle 100 is operated in one or more other modes of operation that would utilize camera data. In certain embodiments, other the process 200 may also begin when a vehicle drive or ignition cycle begins, for example when a driver approaches or enters the vehicle 100, or when the driver turns on the vehicle and/or an ignition therefor (e.g. by turning a key, engaging a keyfob or start button, and so on), and/or when a remote individual accesses the system and/or is able to use the system remotely, and so on. In one embodiment, the steps of the process 200 are performed continuously during operation of the vehicle and/or during operation of the vehicle in a mode of operation that utilizes camera data from one or more vehicle cameras.

Sensor data is obtained at steps 204-206. In various embodiments, the sensor data is obtained simultaneously during steps 204-206 from different sensors of the sensor array 120 of FIG. 1.

Specifically, in various embodiments, camera data is obtained at step 204. In various embodiments, camera image frames are obtained at step 204 from one or more cameras 130 of FIG. 1. In certain embodiments, the camera data includes still camera image frames. In certain other embodiments, the camera data includes video camera image frames.

Also in various embodiments, additional sensor data is obtained at step 206. In various embodiments, the additional sensor data of step 206 includes steering angle sensor data obtained from one or more steering sensors 134, including an angle of the steering wheel 109 of FIG. 1 (for example, including an angle of engagement thereof). In addition, in certain embodiments, the additional sensor data also includes detection sensor data from one or more detection sensors 132 of FIG. 1, such as detection of one or more objects in proximity to the vehicle and/or sounds and/or movement thereof (e.g., via one or more radar, lidar, sonar, microphones, and/or other detection sensors). In certain embodiments, a region of interest for the camera image frame is determined based at least in part on the additional sensor data (e.g., based on the steering angle and/or detected objects, and so on).

Also in various embodiments, user input data is obtained at step 208. In various embodiments, a user (e.g., a driver and/or one or more other passengers of the vehicle) provides one or more user inputs via the display 122 of FIG. 1, which are detected via one or more user interface sensors 136 of FIG. 1. In certain embodiments, the driver (or other passenger) selects a region of interest from the camera image frame on the display 122 (such as by touching a portion of a screen of the display 122 corresponding to the region of interest), which is then detected via the user input sensors 136 (e.g., one or more touch and/or capacitive sensors). In certain embodiments, a region of interest for the camera image frame is determined based at least in part on the selected region of interest from the user. In various embodiments, the data of steps 206 and 208 are fused together and used in combination with one another.

In various embodiments, one or more dark regions are detected in the camera image frame (step 210). In various embodiments, the one or more dark regions comprise one or more areas or sub-regions of the region of interest that appear relatively dark (e.g., with a relatively lower level of brightness) as compared with other regions of the camera image frame, and/or with a level of brightness that is less than a predetermined brightness threshold. For example, in an exemplary embodiment, with image brightness level in the range of 0-255, the process may utilize setting 128 as a predetermined brightness level for the optimal of eyes visibility. However, this may vary in other embodiments. In various embodiments, the detection of the one or more dark regions is performed by the processor 142 of FIG. 1.

Also in various embodiments, one or matched regions are detected (step 212). In various embodiments, the one or more matched regions comprise one or more different areas or regions of the same camera image frame that have similar (or matched) texture as the one or more dark regions but that also has a greater level of brightness (e.g., including a level of brightness that is greater than the one or more dark regions and that is greater than a predetermined brightness threshold). In various embodiments, the detection of the one or more matched regions is also performed by the processor 142 of FIG. 1. In certain embodiments, the texture matching between two image patches relies on an algorithm to compute the similarity scores by extracting descriptor of texture appearances which are invariant to brightness and color information. As an illustrative example, LBP (local binary patterns) may be utilized, for example as referred to in a research publication by S. Liao, M. W. K. Law, A. C. S. Chung, "Dominant local binary patterns for texture classification", IEEE Transaction on Image Processing, 18 (5) (2009), pp. 1107-1118 and incorporated herein by reference.

In various embodiments, respective brightness levels are calculated (steps 214 and 216). Specifically, in various embodiments, a brightness (luma) level of the one or more dark regions of step 210 is calculated in step 214. Also in various embodiments, a brightness (luma) level of the one or more matched regions of step 212 is calculated in step 216. In various embodiments, the calculation of the brightness levels of steps 214 and 216 is performed by the processor 142 of FIG. 1.

Also in various embodiments, a brightness ratio is determined (step 218). In various embodiments, a brightness ratio is estimated or calculated between the respective brightness (luma) levels of the one or more dark regions (as calculated in step 214) and the one or more matched regions (as calculated in step 216). In various embodiments, the brightness ratio is calculated by the processor 142 of FIG. 1 in accordance with the following Equation:

$$\beta = Y_b / Y_d \quad \text{(Equation 1)},$$

in which "$\beta$" represents the brightness ratio, "$Y_d$" represents the brightness (luma) level of the one or more dark regions (i.e., as calculated in step 214), and "$Y_b$" represents the brightness (luma) level of the one or more matched regions (i.e., as calculated in step 216).

In various embodiments, the brightness level of the one or more darker regions is adjusted (steps 220 and 222). Specifically, in various embodiments, a brightness channel of the one or more darker regions is amplified, in order to increase the brightness (luma) level of the one or more darker regions. In various embodiments, the brightness channel of the one or more darker regions is amplified by an amount such that the brightness (luma) level of the one or more darker regions is now equal to (or approximately equal to) the brightness (luma) level of the one or more matched regions, such that the brightness ratio of step 218 would now be equal to (or approximately equal to) one.

In various embodiments, at the same time, the color chromaticity channels of the one or more darker regions are maintained (step 222). In various embodiments, the color chromaticity channels of the one or more darker regions are reserved, or kept constant, such that the color chromaticity levels of the one or more darker regions remain unchanged, even as the brightness level is increased. For example, in certain embodiments, with respect to the camera signals (e.g., YUV pixel format), the image pixels' color-brightness channel separation is maintained in this step.

In various embodiments, steps 220 and 222 are performed by the processor 142 of FIG. 1. Specifically, in various embodiments, the processor 142 increases the brightness (luma) level of the one or more darker regions to be equal to (or substantially equal to) the brightness (luma) level of the one or more matched regions, while maintaining the same color chromaticity for the one or more darker regions. In so doing, the processor 142 provides a digital "flashlight" so as to illuminate the one or more darker regions of the area of interest for improved viewing by the user of the vehicle (e.g., a driver or one or more other passengers of the vehicle 100 of FIG. 1). In various embodiments, the shape, size, and appearance of the digital "flashlight" may be adjusted based on vehicle dynamics and/or other inputs such as sensors, perception, and the like (for example, based on user inputs, steering angle, detected objects and/or movement and/or sound therefrom, and so on).

In various embodiments, a determination is made as to whether the process 200 is to continue (step 224). In various embodiments, this determination is made by the processor 142 of FIG. 1 as to whether a current vehicle drive (e.g., a current vehicle ignition cycle) is still occurring and/or whether the vehicle is currently operating in a mode in which camera data is utilized (e.g., in the case of rear back up camera, whether the vehicle 100 is still in a reverse gear or driving mode, or in other examples whether the vehicle 100 is still operating in a mode in which camera data is being utilized). In various embodiments, if it is determined that the process is to continue (e.g., that camera images are still being utilized), then the process continues, such as by proceeding to step 204 (in which new camera images are obtained) and/or step 210 (in which camera images are processed). In various embodiments, steps 204-224 thereafter repeat in this manner in various iterations until a determination is made in an iteration of step 224 that the process is complete (e.g., that camera images are no longer being utilized), after which the process terminates (step 226).

As alluded to above, FIGS. 3-6 provide exemplary display images associated with respective implementations of the process 200 of FIG. 2 and the vehicle 100 of FIG. 1, in accordance with exemplary embodiments.

Figure 3:
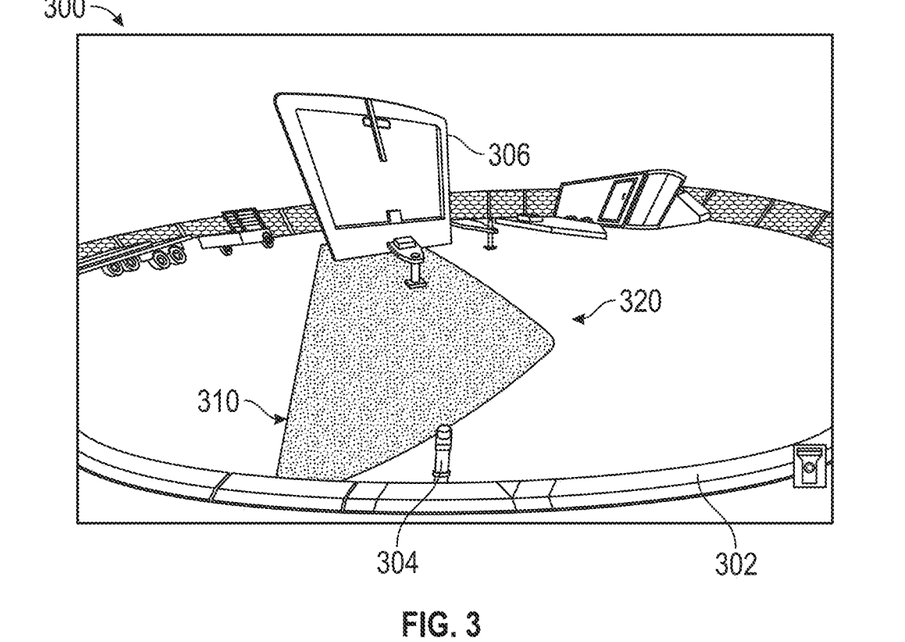
FIGS. 3-6 provide exemplary display images associated with respective implementations of the process of FIG. 2 and the vehicle of FIG. 1, in accordance with exemplary embodiments.

Specifically, FIG. 3 depicts a first display image 300 behind a vehicle prior to the brightness enhancement of the process 200, in accordance with an exemplary embodiment. As depicted in FIG. 3, the display image 300 corresponds to a camera image obtained from a rear camera 130 proximate a bumper 302 of the vehicle 100 of FIG. 1. Also as depicted in FIG. 3, a hitch 304 of the vehicle 100 is captured in the display image 300, along with a trailer 306 in proximity to the vehicle 100 (and, for example, that would be detected by one or more of the detection sensors 132 of FIG. 1). In various embodiments, the trailer 306 is to be coupled to the vehicle 100 via the hitch 304.

As depicted in FIG. 3, the display image 300 includes a darker region 310 with a relatively low level of brightness as compared with the other regions of the display image 300. In certain embodiments, the darker region 310 would be within a region of interest that was selected based on user inputs (e.g., via the user interface sensors 136 of FIG. 1) and/or other sensor data (e.g., a steering angle as detected via the steering sensors 134 of FIG. 1, the trailer 306 as detected via the detection sensors 132 of FIG. 1, and so on).

Also as depicted in FIG. 3, the display image 300 also includes a matched region 320. In various embodiments, the matched region 320 has a similar texture as the darker region 310, but with a greater brightness (luma) level. In various embodiments, the darker region 310 and the matched region 320 would be determined via the processor 142 of FIG. 1 in accordance with the process 200 of FIG. 2, including steps 210 and 212 as described above.

Figure 4:
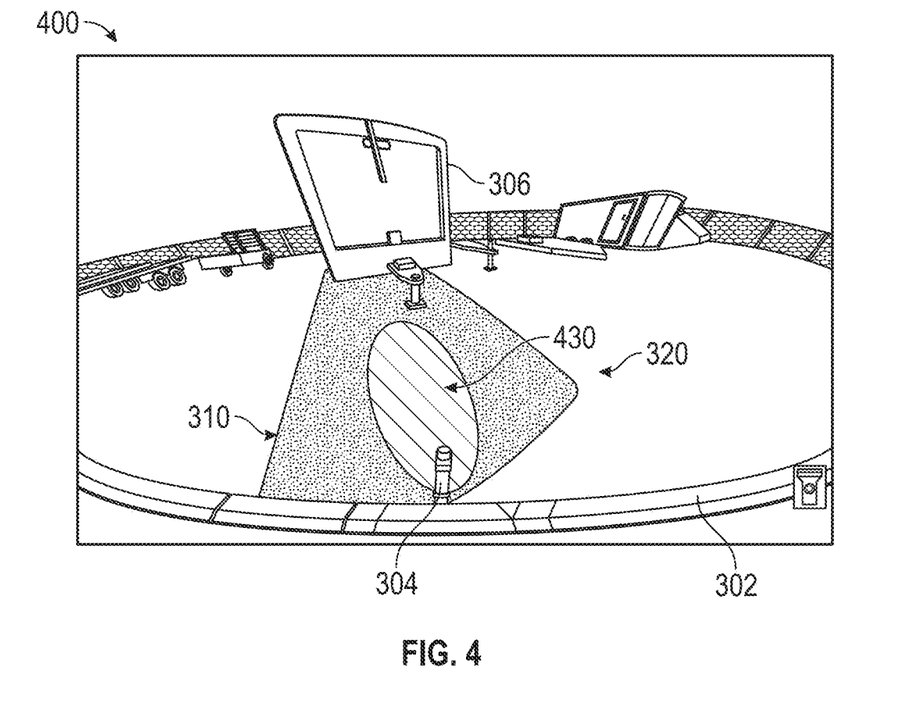

FIG. 4 depicts a second display image 400 behind the vehicle depicted in FIG. 3, but after the brightness enhancement of the process 200, in accordance with an exemplary embodiment. As depicted in FIG. 4, the display image 400 corresponds to a camera image obtained from the rear camera 130 proximate the bumper 302 of the vehicle 100. However, different from FIG. 3, the display image 400 of FIG. 4 depicts a selected region 430 of the darker region 310 with an enhancement brightness (luma). Specifically, as depicted in FIG. 4, the selected region 430 is depicted with an increased brightness (luma) level that is equivalent (or substantially equivalent) to the brightness (luma) level of the matched region 320, without any changes to the color chromaticity of the selected region 430. Accordingly, as depicted in FIG. 4, the selected region 430 is highlighted with a digital "flashlight" for the selected region 430, for enhanced viewing of the selected region 430 (e.g., so that the driver, passenger, or other user of the vehicle 100 can better view the region surrounding the hitching of the trailer 306 via the hitch 304.

Figure 5:
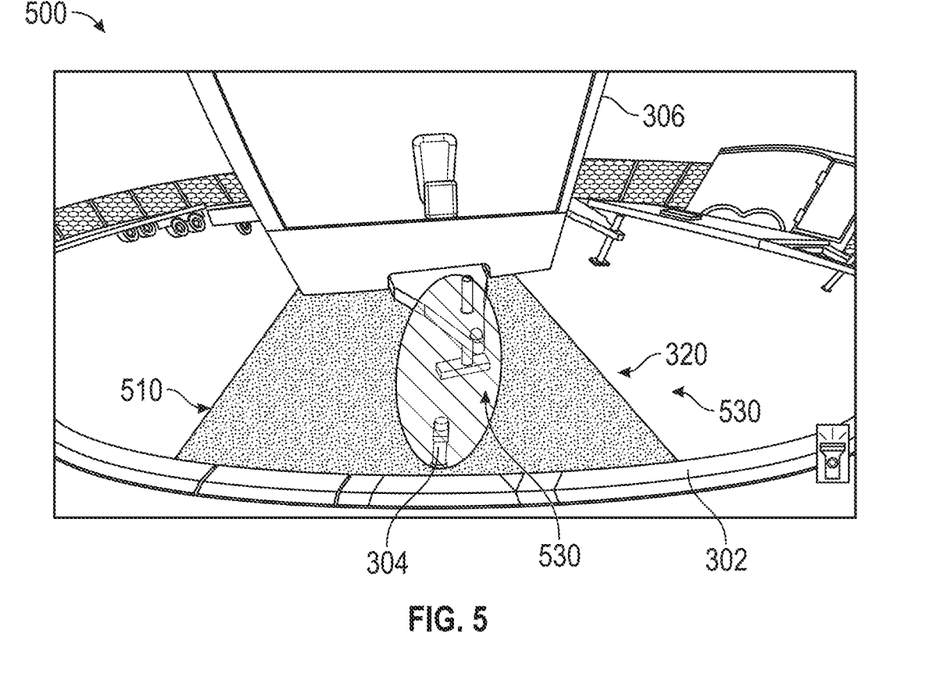

With reference to FIG. 5, in various embodiments, the selected region 530 may be selected by the user (e.g., via the user interface sensors 136 of FIG. 1) and/or utilizing additional sensor data such as based on the steering angle (e.g., via the steering sensors 134 of FIG. 1), the detection of the trailer 306 and/or movement thereof (e.g., via the detection sensors 132 of FIG. 1).

Specifically, FIG. 5 depicts a third display image 500 behind the vehicle depicted in FIGS. 3 and 4, with subsequent brightness enhancement of the process 200 after the vehicle has moved closer to the trailer 306, in accordance with an exemplary embodiment. As depicted in FIG. 5, the display image 400 corresponds to a camera image obtained from the rear camera 130 proximate the bumper 302 of the vehicle 100. Similar to FIG. 4, the display image 500 of FIG. 5 depicts an updated selected region 530 of an updated darker region 510 (e.g., based on a new position of the vehicle 100) with an enhancement brightness (luma). Specifically, as depicted in FIG. 5, the selected region 530 is depicted with an increased brightness (luma) level that is equivalent (or substantially equivalent) to the brightness (luma) level of a matched region 320 (e.g., corresponding to the matched regions 320 of FIGS. 3 and 4), without any changes to the color chromaticity of the selected region 530. Accordingly, as depicted in FIG. 5, the selected region 530 is highlighted with a digital "flashlight" for the selected region 530, for enhanced viewing of the selected region 530 (e.g., so that the driver, passenger, or other user of the vehicle 100 can better view the region surrounding the hitching of the trailer 306 via the hitch 304. Similar to the discussion above, in various embodiments, the selected region 530 may be selected by the user (e.g., via the user interface sensors 136 of FIG. 1) and/or utilizing additional sensor data such as based on the steering angle (e.g., via the steering sensors 134 of FIG. 1), the detection of the trailer 306 and/or movement thereof (e.g., via the detection sensors 132 of FIG. 1).

Figure 6:
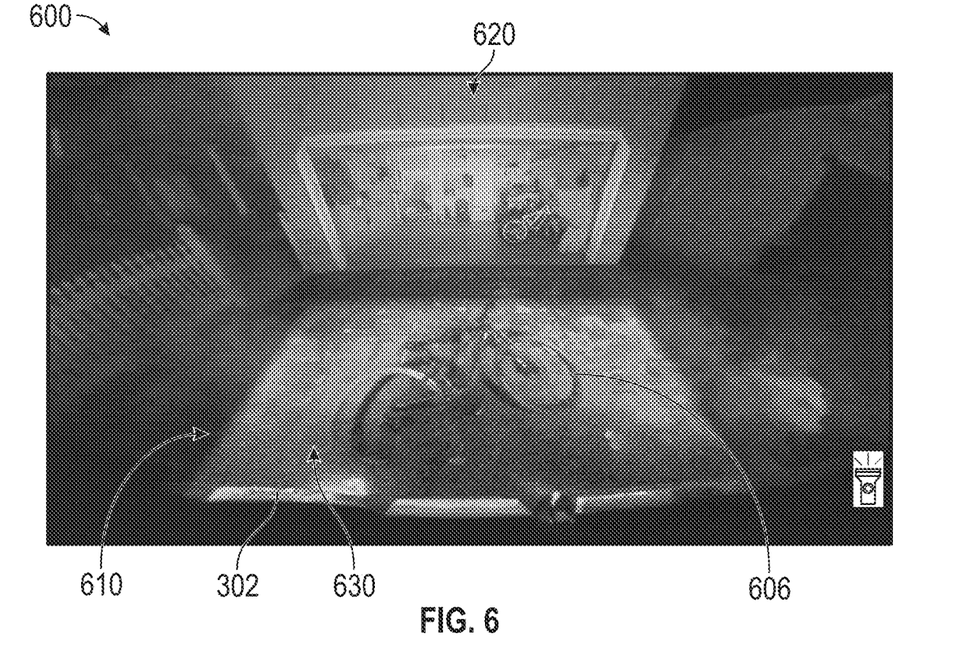

FIG. 6 depicts a fourth display image 600 behind a vehicle (such as the vehicle 100 depicted in FIG. 1 and FIGS. 3-5) after brightness enhancement of the process 200. As depicted in FIG. 6, the display image 600 corresponds to a camera image obtained from the rear camera 130 proximate the bumper 302 of the vehicle 100, and in proximity to a bicycle 606 directly behind the vehicle 100. The display image 600 of FIG. 6 depicts a selected region 630 of a darker region 610 with an enhancement brightness (luma). Specifically, as depicted in FIG. 6, the selected region 630 is depicted with an increased brightness (luma) level that is equivalent (or substantially equivalent) to the brightness (luma) level of a matched region 620, without any changes to the color chromaticity of the selected region 630. Accordingly, as depicted in FIG. 6, the selected region 630 is highlighted with a digital "flashlight" for the selected region 630, for enhanced viewing of the selected region 530 (e.g., so that the driver, passenger, or other user of the vehicle 100 can better view the region in back of the vehicle 100 that includes the detected bicycle 606). Similar to the discussions above, in various embodiments, the selected region 630 may be selected by the user (e.g., via the user interface sensors 136 of FIG. 1) and/or utilizing additional sensor data such as based on the steering angle (e.g., via the steering sensors 134 of FIG. 1), the detection of the bicycle 606 and/or movement thereof (e.g., via the detection sensors 132 of FIG. 1).

Accordingly, methods, systems, and vehicles are disclosed for providing enhanced brightness for a region of interest in camera digital image frames in accordance with various embodiments. In certain embodiments, the disclosed methods, systems, and vehicles provide a digital "flashlight" when an existing brightness of the region of interest is less than a predetermined threshold and/or a brightness present in one or more other regions of the digital images, while maintaining the color chromaticity of the selected region. In various embodiments, this provides potentially improved viewability of the region of interest of the digital camera image frames by a driver, passenger, or other user of the vehicle.

It will be appreciated that the systems, vehicles, and methods may vary from those depicted in the Figures and described herein. For example, the vehicle 100 of FIG. 1, the control system 102 thereof, and/or components thereof of FIG. 1 may vary in different embodiments. It will similarly be appreciated that the steps of the process 200 may differ from that depicted in FIG. 2, and/or that various steps of the process 200 may occur concurrently and/or in a different order than that depicted in FIG. 2. It will similarly be appreciated that the implementations of FIGS. 3-6 may also differ in various embodiments.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. A method comprising: obtaining a camera image frame behind a vehicle via a camera of the vehicle proximate a rear bumper of the vehicle; determining via a processor, a first region of the camera image frame having a first brightness level, wherein the first region is determined via the processor, based at least in part on vehicle dynamics of the vehicle, including a steering angle of the vehicle; wherein the steering angle is obtained via one or more steering sensors coupled to a steering wheel of the vehicle and configured to detect angular engagement thereof; determining, via the processor, a second region of the camera image frame having a second brightness level that is greater than the first brightness level; and displaying, via instructions provided by the processor, the first region with increased brightness that is based on the second brightness level, to thereby provide a digital flashlight for the first region.

2. The method of claim 1, wherein the step of determining the second region comprises determining, via the processor, the second region based on a common texture shared by both the first region and the second region.

3. The method of claim 1, further comprising:
calculating a brightness ratio between the first brightness level and the second brightness level;
wherein the step of displaying the first region with increased brightness comprises displaying the first region with the increased brightness that is based on the brightness ratio.

4. The method of claim 3, wherein the step of displaying the first region with increased brightness comprises displaying the first region with the increased brightness that is equal to the second brightness level, such that the brightness ratio is equal to one.

5. The method of claim 1, wherein the step of displaying the first region with increased brightness comprises displaying the first region with the increased brightness without adjusting a color chromaticity of the first region.

6. The method of claim 1, wherein the first region further corresponds to a region of interest as selected via a user of the vehicle.

7. The method of claim 1, wherein the first region is determined, via the processor, based also at least in part on a detected object in proximity to the vehicle.

8. A system comprising: a display of a vehicle; and a processor coupled to the display of the vehicle and a camera of the vehicle proximate a rear bumper of the vehicle and configured to at least facilitate: obtaining a camera image frame behind the vehicle via the camera of the vehicle; determining a first region of the camera image frame having a first brightness level, wherein the processor is configured to determine the first region based at least in part on vehicle dynamics of the vehicle, including a steering angle of the vehicle; wherein the steering angle is obtained via one or more steering sensors coupled to a steering wheel of the vehicle and configured to detect angular engagement thereof; determining a second region of the camera image frame having a second brightness level that is greater than the first brightness level; and providing instructions to the display of the vehicle for displaying the first region with increased brightness that is based on the second brightness level, to thereby provide a virtual flashlight for the first region.

9. The system of claim 8, wherein the processor is further configured to at least facilitate:
determining the second region based on a common texture shared by both the first region and the second region.

10. The system of claim 8, wherein the processor is further configured to at least facilitate:
calculating a brightness ratio between the first brightness level and the second brightness level; and
providing instructions to the display of the vehicle for displaying the first region with the increased brightness that is based on the brightness ratio, such that the brightness ratio is equal to one.

11. The system of claim 8, wherein the processor is further configured to at least facilitate:
providing instructions to the display of the vehicle for displaying the first region with the increased brightness without adjusting a color chromaticity of the first region.

12. The system of claim 10, wherein the first region further corresponds to a region of interest as selected via a user of the vehicle.

13. The system of claim 8, wherein the processor is configured to at least facilitate determining the first region based also at least in part on a detected object in proximity to the vehicle.

14. A vehicle comprising: a camera disposed proximate a rear bumper of the vehicle and configured to generate camera data comprising a camera image frame of an environment pertaining to the vehicle, behind the vehicle; a body defining a cabin of the vehicle; a display of the vehicle disposed inside the cabin; and a processor coupled to the display of the vehicle and the camera of the vehicle and configured to at least facilitate: determining a first region of the camera image frame having a first brightness level, wherein the processor is configured to determine the first region based at least in part on vehicle dynamics of the vehicle, including a steering angle of the vehicle; wherein the steering angle is obtained via one or more steering sensors coupled to a steering wheel of the vehicle and configured to detect angular engagement thereof; determining a second region of the camera image frame having a second brightness level that is greater than the first brightness level; and providing instructions to the display of the vehicle for displaying the first region with increased brightness that is based on the second brightness level, to thereby provide a virtual flashlight for the first region.

15. The vehicle of claim 14, wherein the processor is further configured to at least facilitate:
providing instructions to the display of the vehicle for displaying the first region with the increased brightness without adjusting a color chromaticity of the first region.

16. The method of claim 1, wherein:
the camera image includes a second vehicle in proximity to and behind the vehicle; and
the digital flashlight is provided for the second vehicle that is in proximity to and behind the vehicle.

17. The method of claim 16, wherein the second vehicle comprises a bicycle that is disposed in proximity to and behind the vehicle.

18. The method of claim 16, wherein the second vehicle comprises a trailer that is disposed in proximity to a hitch of the vehicle and that is configured to be connected to the vehicle via the hitch of the vehicle.

19. The vehicle of claim 14, wherein:
the camera image includes a second vehicle in proximity to and behind the vehicle; and
the digital flashlight is provided for the second vehicle that is in proximity to and behind the vehicle.

\* \* \* \* \*